(12) United States Patent
Bruck

(10) Patent No.: US 9,597,749 B2
(45) Date of Patent: Mar. 21, 2017

(54) LASER WAVEGUIDE WITH COAXIAL FILLER WIRE FEED

(71) Applicant: Siemens Energy, Inc., Orlando, FL (US)

(72) Inventor: Gerald J. Bruck, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 185 days.

(21) Appl. No.: 14/710,626

(22) Filed: May 26, 2015

(65) Prior Publication Data

US 2016/0346875 A1 Dec. 1, 2016

(51) Int. Cl.

| | |
|---|---|
| *B23K 26/21* | (2014.01) |
| *B23K 26/073* | (2006.01) |
| *B23K 26/70* | (2014.01) |
| *B23K 26/06* | (2014.01) |
| *H01S 3/067* | (2006.01) |
| *H01S 3/094* | (2006.01) |
| *H01S 3/063* | (2006.01) |

(Continued)

(52) U.S. Cl.
CPC .......... *B23K 26/21* (2015.10); *B23K 26/0608* (2013.01); *B23K 26/0648* (2013.01); *B23K 26/0734* (2013.01); *B23K 26/14* (2013.01); *B23K 26/1476* (2013.01); *B23K 26/211* (2015.10); *B23K 26/34* (2013.01); *B23K 26/703* (2015.10); *H01S 3/063* (2013.01); *H01S 3/0608* (2013.01); *H01S 3/0405* (2013.01); *H01S 3/0675* (2013.01); *H01S 3/06737* (2013.01)

(58) Field of Classification Search
CPC .. B23K 26/21; B23K 26/702; B23K 26/0648; B23K 26/073; B23K 26/0608; H01S 3/0675; H01S 3/094042; H01S 3/094015
USPC ............................... 219/121.63; 228/244, 41
See application file for complete search history.

(56) References Cited

U.S. PATENT DOCUMENTS

| | | |
|---|---|---|
| 4,580,026 A | 4/1986 | Stol |
| 4,658,109 A | 4/1987 | Honeycutt et al. |

(Continued)

FOREIGN PATENT DOCUMENTS

| | | |
|---|---|---|
| CN | 104289811 A | 1/2015 |
| DE | 19832168 A1 | 1/2000 |

(Continued)

OTHER PUBLICATIONS

Author unknown; "Fiber Laser"; Wikipedia; Apr. 18, 2015, worldwide on-line publication.

*Primary Examiner* — Samuel M Heinrich

(57) ABSTRACT

A laser waveguide (22) with a tubular wall (24) that conducts laser energy (30) from a near end (23) to a far end (27) of the waveguide. A filler feed wire (36) slides through the hollow center of the waveguide. A laser emitter (40) delivers laser beam energy (30) to a first end of the waveguide within an acceptance angle A. The laser beam may be non-parallel to an axis (25) of the waveguide by at least 20 degrees to provide room for the laser emitter beside the feed wire. The near end of the waveguide may be flared (23C) to accept a laser beam at a greater angle from the axis. The beam exits the waveguide (32) with an annular energy distribution about the feed wire, and may be focused toward the feed wire by a lens (34) having an axial hole (37) for the wire.

20 Claims, 4 Drawing Sheets

(51) Int. Cl.
*H01S 3/06* (2006.01)
*B23K 26/14* (2014.01)
*B23K 26/34* (2014.01)
*H01S 3/04* (2006.01)

(56) References Cited

U.S. PATENT DOCUMENTS

| | | | |
|---|---|---|---|
| 6,504,127 | B1 | 1/2003 | McGregor et al. |
| 7,373,062 | B2 | 5/2008 | Huber |
| 7,903,714 | B2 * | 3/2011 | von Borstel .............. H01S 3/02 |
| | | | 372/55 |
| 8,781,269 | B2 | 7/2014 | Huber et al. |

FOREIGN PATENT DOCUMENTS

| | | |
|---|---|---|
| DE | 102004025873 A1 | 12/2005 |
| DE | 102013113395 A1 | 6/2014 |
| EP | 2411868 B1 | 3/2013 |
| JP | 2003251480 A | 9/2003 |

* cited by examiner

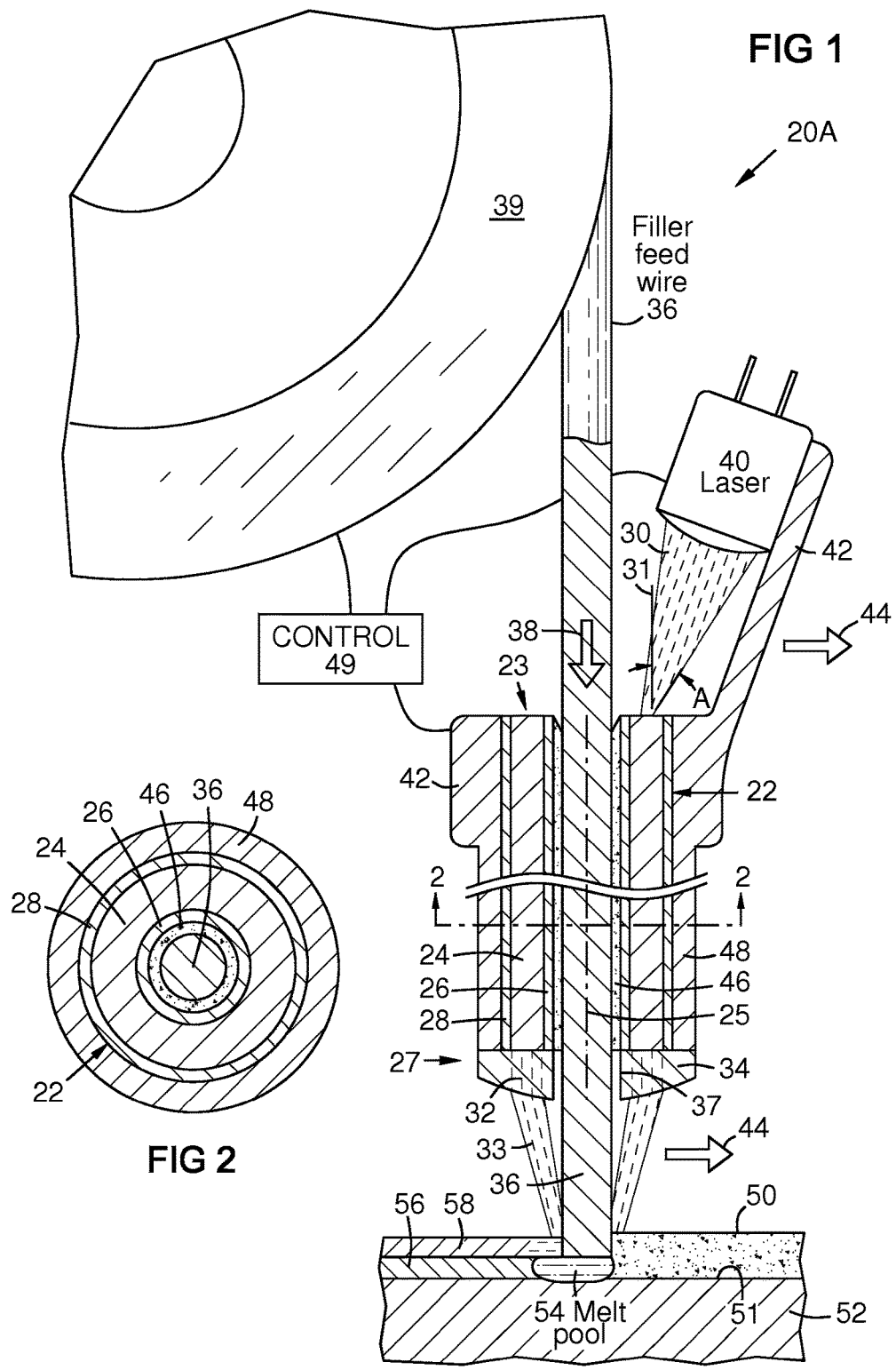

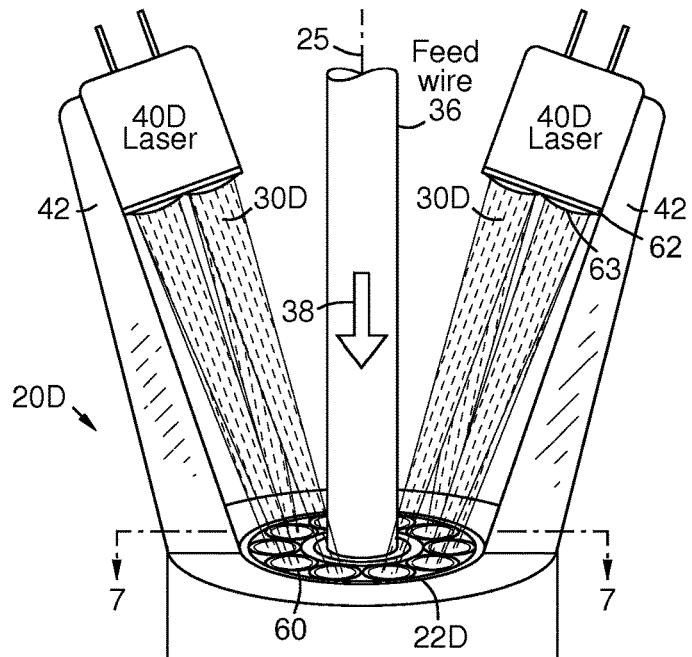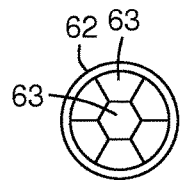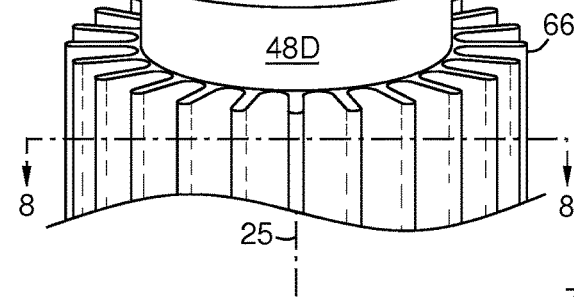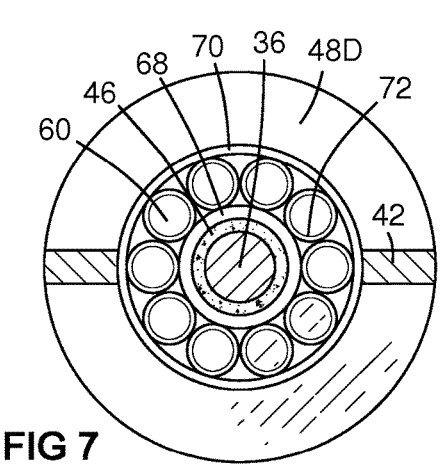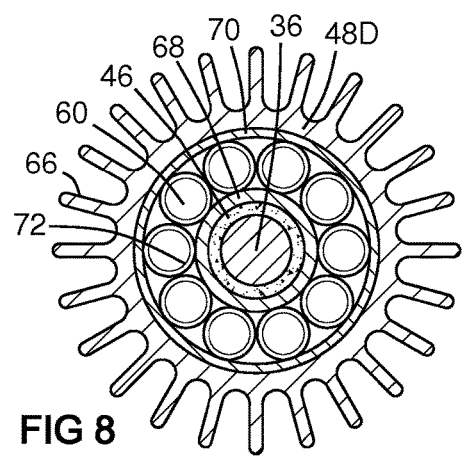

LASER WAVEGUIDE WITH COAXIAL FILLER WIRE FEED

FIELD OF THE INVENTION

This invention relates to laser welding, cladding, and fabrication of metal substrates with filler metal, and particularly relates to feeding of a filler metal wire through a tubular laser waveguide while transmitting laser energy through the walls of the waveguide for beam delivery to the filler wire tip as it traverses over a substrate.

BACKGROUND OF THE INVENTION

Control of the location of feed wire during a metal deposition process is important to achieving high quality material deposition. In conventional gas metal arc welding (GMAW) processes, uncontrolled wire wandering can occur due to curvature of the wire from winding on a spool causing random lateral motion at the point of delivery. This curvature is quantified by two parameters: 1) cast—the diameter of a loop of wire laying on a flat surface; and 2) helix—the pitch or lift-off of a loop of wire laying on a flat surface. Minimum cast and maximum helix are normally controlled by weld wire manufacturers to American Welding Society specifications as they affect wire deflection and point of delivery during welding. U.S. Pat. No. 4,580,026 describes an in-line electrical resistance hot wire weld feed system that helps deliver a feed wire in a straight fashion by annealing the wire during delivery, which removes the curved cast and helix of the wire caused by spooling.

Laser beams are also used to melt filler metal onto a substrate for welding, cladding, and additive fabrication. Often, powdered feed material is used. However, laser deposition of wire feed material requires coordinating the wire feed position with the laser power delivery spot. It is challenging to mechanically compel the tip of a small diameter wire (such as 1 mm) to coincide with a similarly sized focal spot of a laser beam, especially when both are motion-controlled independently. For example, the laser beam may be controlled by galvanometer-driven optics, and the wire may be controlled by a mechanical manipulator and feed system.

BRIEF DESCRIPTION OF THE DRAWINGS

The invention is explained in the following description in view of the drawings that show:

FIG. 1 is a side sectional view of a tubular laser waveguide and a coaxial filler wire according to aspects of the invention.

FIG. 2 is a transverse sectional view of the apparatus of FIG. 1 taken on line 2-2.

FIG. 5 is a perspective view of an embodiment with an annular distribution of axially oriented optical fibers and an outer case with cooling fins.

FIG. 6 is a front surface of a lens element array for subdividing a laser beam into multiple beams directed to respective optical fibers.

FIG. 7 is a sectional view taken on line 7-7 of FIG. 5.

FIG. 8 is a sectional view taken on line 8-8 of FIG. 5.

DETAILED DESCRIPTION OF THE INVENTION

Figure 3:
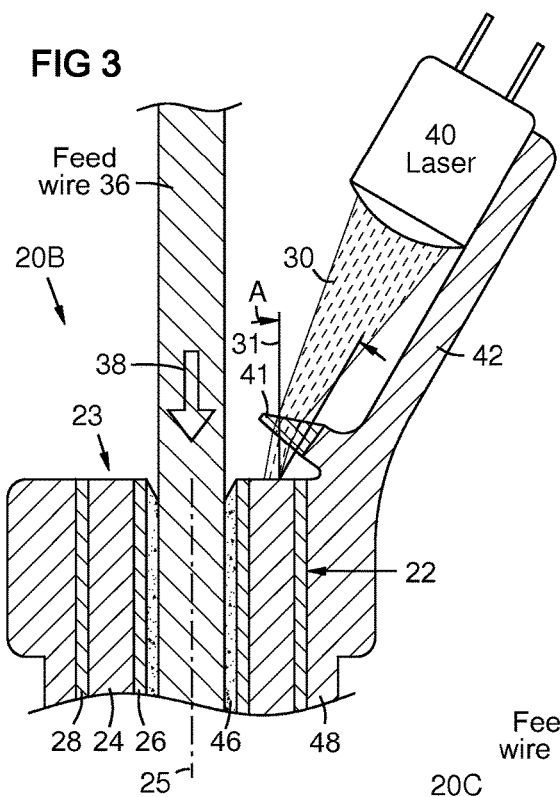
FIG. 3 is a side sectional view of an embodiment with an increased angle of separation of the laser emitter from the feed wire.

The present invention solves the problem of coordinating the simultaneously moving positions of filler material and laser power during a laser material deposition process. An apparatus is described which captures filler material within a hollow center region of a laser waveguide such that both the filler material and waveguide can be traversed together across a substrate as the filler material is fed through the waveguide and into a laser beam emanating from a distal end of the waveguide.

FIG. 1 shows an embodiment 20A of a tubular laser waveguide 22 with a laser-transparent wall 24 having an inner diameter with an optional inner cladding 26, and an outer diameter with an optional outer cladding 28. Each cladding may have a lower refractive index than that of the tubular wall 24, which is the transmission medium or core of the waveguide. A laser beam 30 may be coupled into the proximal end 23 of the tubular wall 24 within the angle of acceptance A, which may in some embodiments be relative to a line 31 parallel to the waveguide axis 25. Total internal reflections cause the laser beam to progress axially inside the tubular wall while dispersing circumferentially, resulting in a tubular laser beam 32 with annular intensity distribution emitted at the distal end 27. A feed material such as a filler feed wire 36 is fed 38 by a wire feed device 39 through the hollow center of the waveguide 22. A convex lens 34 with an axial hole 37 for the wire may be provided on the distal end of the waveguide to converge the laser beam onto the distal end or tip of the feed wire 36 or a substrate 52. The waveguide 22 and the laser emitter 40 may be mounted on a common transport structure 42 so they traverse 44 across the substrate 52 in unison. Alternately the substrate may be moved with respect to the transport structure. The wire feed device 39, or at least a final guide element thereof, may be also be attached to the common transport structure 42. The wire feed device 39, laser emitter 40, and transport structure 42 may be controlled by a program logic controller 49. Thus, the distally emitted laser beam 33 moves with the tip of the feed wire 36 as it traverses 44 over the substrate 52. The laser power may be modulated according to the wire feed rate. A heat resistant low friction material 46 such as graphite or hexagonal boron nitride or a cobalt based alloy may be provided as an inner coating on the inner cladding 26. This facilitates the feed wire sliding through the hollow center of the tubular waveguide 22 and protects the waveguide from wear. A protective outer cover 48 may be provided around the outer cladding 28. The outer cover may be rigid to transmit motion 44 and may be metal to act as a heat sink and radiator. Flux 50, with or without additional metal filler powder mixed or conglomerated with the flux, may be placed over the working surface 51 of the substrate 52. The laser energy forms a melt pool 54 of filler metal, which solidifies to form an additive layer or deposit 56 covered with slag 58. The wire feed device 39 may include a spool, drive motors, push and pull drive wheels, and wire straightening wheels. FIG. 2 is a transverse sectional view of the waveguide 22 and filler feed wire 36 taken on line 2-2 of FIG. 1.

FIG. 3 shows an embodiment 20B with an optical beam redirection device such as a prism 41 or mirror between the laser emitter 40 and the proximal end 23 of the waveguide. This may redirect the approaching laser beam 30 toward the acceptance angle reference line 31, which may be parallel to the waveguide axis 25. Thus it may redirect the laser beam from outside the acceptance angle A to within the acceptance angle. This allows the beam to approach from any direction, thus providing flexibility in designing the location of the emitter 40.

Figure 4:
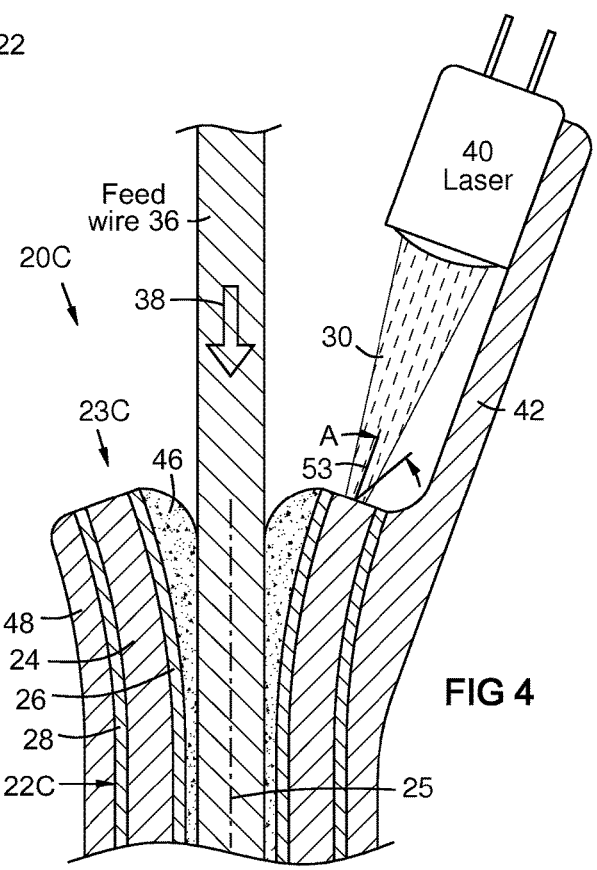
FIG. 4 is a side sectional view of an embodiment with a flared tubular waveguide.

FIG. 4 shows an embodiment 20C with a flared tubular waveguide 22C. The flare allows the laser emitter 40 to be mounted at a greater distance from the feed wire than in FIG. 1, because the acceptance angle A is relative to a line 53 that diverges from the axis 25 of the waveguide. For a given position of the laser emitter 40, the flare reduces the incidence angle of the beam 30 at the proximal end 23C of the waveguide. The flare also allows a funnel-shaped entrance for the wire 36 and/or greater thickness in the low friction coating 46 at the entrance to protect the inner cladding 26 from the wear of repeated insertion of wires into the waveguide.

FIG. 5 shows an embodiment 20D with a tubular waveguide 22D formed by an annular distribution of axially oriented optical fibers 60. A laser beam 30D may be directed into the proximal end of each fiber 60 by a lens array 62 with a lens element 63 for each of several fibers 60. Each lens element 63 may combine prism and sphere aspects to direct and focus the beam to the core of each fiber. With this technique two laser emitters 40D can cover all of the fibers 60 without overlapping the beams into the claddings or elsewhere. The lens elements 63 may be tightly packed, such as the 7 lens elements shown in FIG. 6, so that no beam leakage occurs between the elements. Alternately a partial annular energy distribution may be delivered. For example, a semi-annular energy distribution may be provided by only one of the lasers 40D, and this may be sufficient in some circumstances. Alternately a separate laser emitter may be provided for each optical fiber 60.

Cooling fins 66 may be provided on the outer cover 48D of the waveguide. Air or another gas may be blown over these fins, such as an inert gas that functions to additionally shield the melt pool 54. Optionally, a cooling jacket (not shown) around the outer cover 48D with baffles or serpentine passages maybe provided for cooling air or another gas or a liquid coolant.

FIGS. 7 and 8 show respective transverse sectional views of the apparatus of FIG. 5 taken on lines 7-7 and 8-8. Inner and outer protective layers 68, 70 may be provided for the array of optical fibers 60 in addition to the cladding 72 on each fiber.

Figure 9:
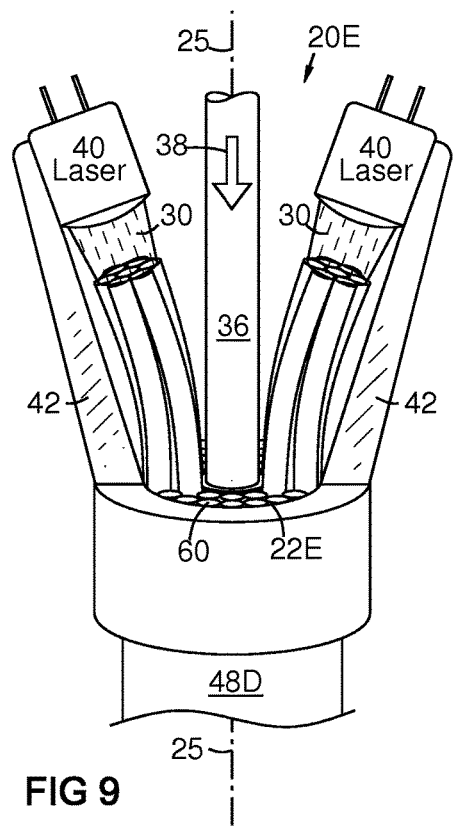
FIG. 9 is a perspective view of an embodiment with optical fibers diverging from the waveguide axis to receive laser beams off-axis from the waveguide.

FIG. 9 shows an embodiment 20E of a tubular waveguide 22E formed by an annular distribution of axially oriented optical fibers 60. The optical fibers may diverge at a proximal end thereof from an axis 25 of the waveguide 22E to receive laser beams 30 that are non-parallel to the axis 25 of the waveguide.

The laser beams 30 herein may be non-parallel to the optical axis 25 of the waveguide by at least 20 degrees, to provide room for the laser emitter 40 beside the feed wire 36. Materials for the laser waveguide transmission media and claddings described herein may be provided as known in the art. For example a non-active, non-lasing waveguide may comprise a silica glass inner core 60 surrounded by a cladding 72 with a lower index of refraction. Alternately the waveguide may comprise an annular element 24 as previously shown, surrounded both inside and outside by a lower index of refraction cladding 26, 28. The silica glass annular element may include such dopants as $GeO_2$ or $Al_2O_3$ to raise the index of refraction, and the cladding may include dopants such as F or $B_2O_3$ to reduce the index of refraction. Only small differences in index (e.g. less than about 1%) are required to achieve total internal reflection and transmission through the waveguide. A hollow core optical fiber has been patented by Huber in U.S. Pat. No. 7,373,062 but without contemplating to use the hollow core for processing. In fact, sealing of the end to close and protect the cavity is of greatest merit in Huber. In U.S. Pat. No. 8,781,269 Huber extends such annular geometry to include a core filled with additional fiber material such that laser energy may be transmitted either in the core or in the annular fiber surrounding it.

Figure 10:
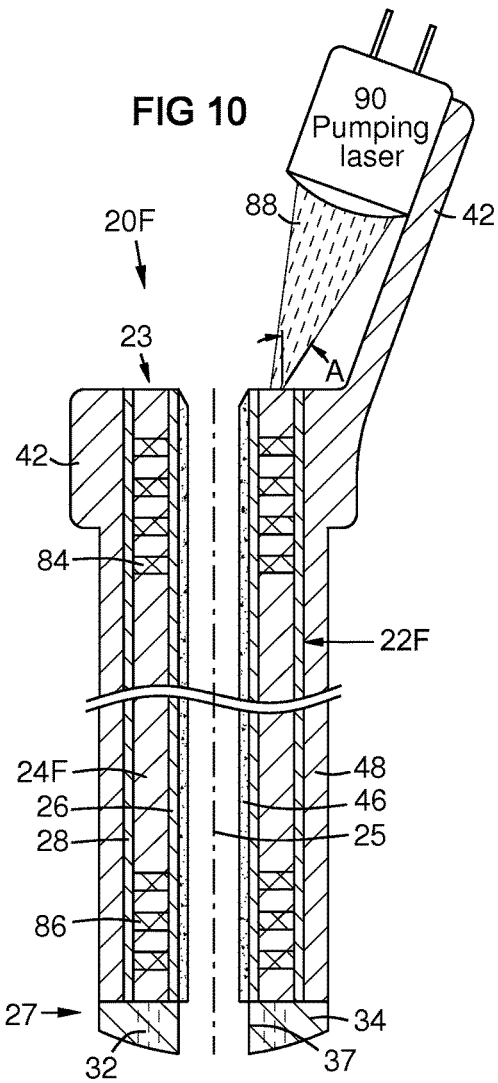
FIG. 10 is a side sectional view of a fiber laser embodiment.

FIG. 10 shows an embodiment 20F in which the tubular wall 24F of the waveguide 22F contains dopants such as erbium, ytterbium, neodymium, dysprosium, praseodymium, and thulium that provide an optical gain medium as a laser resonator, making the waveguide a fiber laser. An in-line Bragg grating 84, 86 may be spliced to each end of the waveguide to serve as a high reflector 84 at the proximal end of the waveguide and as a partial reflector 86 at the distal end. Laser pumping energy 88 may be introduced into the proximal end of the tubular wall of the waveguide by a diode laser 90 or other means using any of the previously described techniques for introducing a laser beam 30 into the waveguide. Alternately, the annular distribution of optical fibers 60 of FIGS. 5-9 may be replaced with fiber lasers, and the laser emitters of FIGS. 5 and 9 may be optical pumping lasers such as a diode laser.

Figure 11:
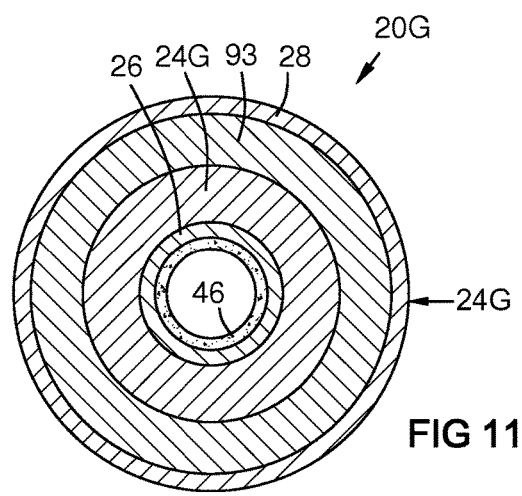
FIG. 11 is a transverse sectional view of a second fiber laser embodiment.

FIG. 11 is a transverse sectional view of a double-clad fiber laser embodiment 20G. A tubular wall or core 24G provides both laser transmission and amplification. The core may be silica glass including dopants, especially rare earth elements, providing a medium that lases between reflectors at the ends of the core upon stimulation. Two layers of cladding 93, 28 surround the core. A first cladding 93 in contact with the core 24G may be a material such as silica glass without an active lasing dopant but with e.g. F or $B_2O_3$ to reduce the refractive index. It acts as a pump waveguide, receiving a pumping beam at one end, and feeding the energy into the core 24G along its sides. It has a lower refractive index than the core to internally reflect the lasing energy within the core. A second cladding 28 on the first cladding 93 has a lower refractive index than first cladding 93, and thus internally reflects the pumping beam toward the core. Alternately or additionally, not shown, a pump beam waveguide may be disposed between the inner diameter of the core 24G and the inner cladding 26. Bragg gratings may be spliced to each end of the tubular wall 24G as shown in FIG. 10. Laser pumping energy may be coupled into the first cladding 93 by any means for introducing a laser beam 30 shown in FIG. 1, 3, 4, or 10.

The laser energy conducting element may be non-circular in cross-sectional shape, such as rectangular shape for delivery of strip or ribbon filler metal, or it may have a non-closed perimeter, such as being C-shaped. The filler material may be solid wire or it may be of composite composition, such as a cored wire with flux and/or metal powder provided within the wire itself. The filler metal may be pre-heated electrically when fed into the laser energy conducting element, and continuous or pulse lasers may be used in various embodiments. For embodiments employing multiple lasers as shown in FIGS. 5 and 9, power may be independently adjusted through optical fibers 60 to manipulate power distribution at the point of processing.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus comprising:
a laser waveguide comprising a wall configured to conduct a laser energy axially from a proximal end to a distal end of the waveguide;
a hollow center of the waveguide that slidably guides a filler feed wire from the proximal end to the distal end of the waveguide; and
a first laser emitter that delivers a first laser beam to the proximal end of the waveguide within an acceptance angle of the waveguide;
wherein the laser energy emerges from the distal end of the waveguide with an energy distribution about the feed wire.

2. The apparatus of claim 1 further comprising:
a wire delivery apparatus that feeds the feed wire through the waveguide; and
a controller;
wherein the wire delivery apparatus, the first laser emitter, and the waveguide are all mounted on a common transport structure to move in unison in a traversing direction across a substrate.

3. The apparatus of claim 1 further comprising a metal outer cover with cooling fins on the waveguide.

4. The apparatus of claim 1 further comprising a coating comprising graphite or hexagonal boron nitride or a cobalt based alloy on an inner diameter of the waveguide.

5. The apparatus of claim 1 further comprising a convex lens on the distal end of the waveguide, the convex lens comprising an axial hole that admits the filler feed wire, wherein the convex lens converges the laser energy on a portion of the filler feed wire extending from the distal end of the waveguide or on the substrate.

6. The apparatus of claim 1 further comprising a flared proximal end on the waveguide, providing an acceptance angle that is relative to a line that diverges from a longitudinal axis of the waveguide.

7. The apparatus of claim 1 further comprising an optical element between the first laser emitter and the proximal end of the waveguide that redirects the first laser beam from outside the acceptance angle to within the acceptance angle.

8. The apparatus of claim 1 wherein the wall comprises an annular distribution of a plurality of axially oriented laser optical fibers.

9. The apparatus of claim 8 further comprising:
a first plurality of lens elements, wherein each of the first plurality of lens elements directs a respective portion of the first laser beam to a core of one fiber of a first subset of the optical fibers; and
a second laser emitter and a second plurality of lens elements, wherein the second laser emitter emits a second laser beam, and each of the second plurality of lens elements directs a portion of the second laser beam to a core of one fiber of a second subset of the optical fibers.

10. The apparatus of claim 8 wherein the plurality of optical fibers diverge at a proximal end thereof from an axis of the waveguide, and receive, individually or in bundles of the fibers, a laser beam that is non-parallel to the axis of the waveguide.

11. The apparatus of claim 1 wherein the first laser beam is non-parallel to a longitudinal axis of the waveguide by at least 20 degrees to provide room for the laser emitter beside the feed wire.

12. The apparatus of claim 1 wherein the waveguide forms a fiber laser that is pumped by the first laser beam.

13. The apparatus of claim 12 further comprising:
a dopant in the wall that makes it a laser gain medium;
a first Bragg grating in the proximal end of the wall providing an axial reflection of the laser energy in the wall; and
a second Bragg grating in the distal end of the wall providing a partial axial reflection of the laser energy therein;
wherein the laser emitter comprises a diode laser that pumps the laser energy in the wall.

14. An apparatus comprising:
a laser waveguide comprising a cross-sectional shape defining a hollow center along its axial length; and
a feed material extending through the hollow center and slidable from a proximal end to a distal end of the laser waveguide.

15. The apparatus of claim 14, further comprising an optical element at the distal end of the laser waveguide for focusing a laser beam passing through the waveguide.

16. The apparatus of claim 14, further comprising an optical element at the proximal end of the laser waveguide for directing laser energy onto the proximal end of the waveguide.

17. The apparatus of claim 14, further comprising a friction reducing or wear protectant material disposed on an inside surface of the laser waveguide.

18. The apparatus of claim 14, wherein the waveguide comprises a fiber laser operable to be pumped by an energizing device to amplify laser energy in the waveguide.

19. The apparatus of claim 14, wherein the laser waveguide comprises an annular distribution of a plurality of axially oriented laser optical fibers.

20. The apparatus of claim 14, wherein the laser waveguide comprises a tubular shape having a circular cross-sectional shape.

* * * * *